United States Patent Office 2,991,288
Patented July 4, 1961

2,991,288
CAMPHIDINE DERIVATIVES
Jørgen Fakstorp, Charlottenlund, and Kurt Rubinstein, Horsholm, Denmark, assignors to Aktieselskabet Pharmacia, Copenhagen, Denmark
No Drawing. Filed June 3, 1958, Ser. No. 739,469
Claims priority, application Germany June 5, 1957
4 Claims. (Cl. 260—293)

This invention relates to camphidine derivatives and methods of their preparation and more particularly to camphidine compounds useful as or in chemo-therapeutic preparations having a hypotensive and ganglion blocking activity in mammals.

Specifically the invention relates to N-substituted camphidines and acid addition salts and quaternary ammonium salts thereof.

The main object of the invention is to provide novel camphidine compounds and methods for the preparation thereof.

A more specific object of the invention is to provide novel N-substituted camphidines and acid addition salts and quaternary ammonium salts thereof and methods for their preparation.

A particular object of the invention is to provide novel N-alkyl- and N-alkylaminoalkyl-camphidines and acid addition salts and mono- and bis-quaternary ammonium salts thereof and methods for their preparation.

A more particular object of the invention is to provide novel chemotherapeutic N-alkyl- and N-alkylamino-alkyl-camphidines and acid addition salts and mono- and bis-quaternary salts thereof, said compounds having a hypotensive and ganglion blocking activity in mammals, and methods for their preparation.

A still more particular object of the invention is to provide novel chemotherapeutic bis-quaternary ammonium salts of N-alkylamino-alkyl-camphidines having a strong hypotensive activity in mammals and a ganglion blocking activity with a favourable ratio between the ganglion blocking activity in the sympathetic part and in the parasympathetic part of the autonomous nervous system, and methods for their preparation.

These and other objects and the manner in which they are accomplished will become apparent to those conversant with the art from the following description of the general class of compounds and certain specific examples of particular members thereof as well as general and specific methods of their synthesis.

The novel compounds of the present invention are N-substituted 5-chloro-camphidines having the formula

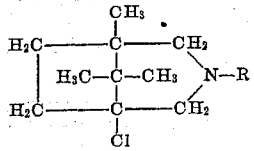

in which R represents an alkyl or alkylaminoalkyl group, especially a low-molecular alkyl group having 1 to 4 carbon atoms or a low-molecular alkylaminoalkyl group, in which each alkyl group has 1 to 4 carbon atoms, and acid addition salts and quaternary ammonium salts of said camphidine derivatives.

Especially useful novel compounds of the invention are N-dimethylaminopropyl-5-chloro-camphidine, N-dimethylaminopropyl-5-chloro-camphidine-hydrochloride, N-trimethylammoniumpropyl - N-methyl-5-chloro-camphidinium-diiodide, N - trimethylammoniumpropyl-N-methyl-5-chloro - camphidinium-sulphate, N-trimethylammoniumpropyl - N - methyl-5-chloro-camphidinium-dimethosulphate and N-trimethyl-ammonium-5-chloro-camphidinium-methosulphate.

Of the novel compounds according to the invention the N-alkyl-5-chloro-camphidines and their acid addition salts and quaternary ammonium salts have a short hypotensive and ganglion blocking activity and a comparatively low toxicity. The N-alkylaminoalkyl-5-chloro-camphidines and their acid addition salts and mono- and bis-quaternary ammonium salts which also have a comparatively low toxicity, have a long-acting hypotensive and ganglion blocking activity. Their activity of blocking the ganglion in the sympathetic part of the autonomous nervous system is more pronounced than their activity of blocking the ganglion in the parasympathetic part of the autonomous nervous system. When using them as or in means for relief of hypertension in mammals they produce therefore less undesired secondary effects than N-alkylaminoalkyl-camphidines and acid addition salts and mono- and bis-quaternary ammonium salts thereof which are known ganglion-blocking pharmaceuticals used for reducing the blood-pressure in mammals.

The novel camphidine compounds of this invention may be given orally in the form of tablets, capsules and the like and are absorbed from the gastrointestinal tract of mammals. Their solutions in the usual solvents of medicines for injections may also be injected.

Generally stated the novel compounds of this invention are obtained by reduction by suitable means, especially lithium aluminum hydride, of an optically active or racemic N-substituted 5-chloro-camphoric acid imide to the corresponding N-substituted 5-chloro-camphidine which by reaction with an acid or a quaternizing agent containing one or two alkyl groups, preferably with 1 to 4 carbon atoms, may be converted into the corresponding acid addition salt or into the corresponding mono- or bis-quaternary ammonium salt. The anion of the quaternary ammonium salt obtained may thereafter be exchanged with another anion by using one of the usual methods known in the art.

Some of the N-substituted 5-chloro-camphoric acid imides used as starting materials in the above process are known compounds, whereas the other imides are hitherto unknown compounds. They may be prepared by introduction of the desired N-substituent into 5-chloro-camphoric acid imide by employing usual substitution methods. Thus N-alkyl-5-chloro-camphoric acid imide may be prepared by treating 5-chloro-camphoric acid imide with an alkyl halogenide in alcoholic alkali metal hydroxide solution at room temperature, whereas N-alkyl-aminoalkyl-5-chloro-camphoric acid imides are obtained by reaction of 5-chloro-camphoric acid imide with a hydrohalogenide of an alkylaminoalkyl halogenide at a temperature above room temperature and in alcoholic alkali metal hydroxide solution.

The following examples of specific compounds and methods will illustrate the manner in the general synthesizing procedure which may be applied to obtain particular members of the class of compounds discovered. It will be understood, however, that the following examples are not nor are they intended to be exhaustive of all compounds embraced by the present invention.

Example 1

5-chloro-camphoric acid imide (65 g.) was dissolved at room temperature in a solution of 85.2% potassium hydroxide (20.6 g.) in ethanol (935 ml.) and a solution of methyl iodide (65.5 g.) in absolute ethanol (520 ml.) was added. After standing at room-temperature for 24 hours the precipitated potassium iodide was filtered off and the filtrate evaporated in a vacuum and then extracted with benzene (520 ml.). The extract was evaporated in a vacuum, and the residue recrystallized from aqueous ethanol. Yield: 60.5 g. of N-methyl-5-chloro-camphoric acid imide, M.P. 141–143° C.

During 1 hour N-methyl-5-chloro-camphoric acid imide (22 g.) in dry ether (300 ml.) was added to a solution of lithium aluminium hydride (8.4 g.) in dry ether (100 ml.) and the mixture was heated under reflux for 60 minutes and then kept for 15 hours at room-temperature. Water (11.5 ml.), 15% sodium hydroxide solution (11.5 ml.) and finally water (37 ml.) was successively added. The precipitated hydroxide was filtered off and washed with ether (5 x 60 ml.). The ether solution was dried with magnesium sulphate, the ether evaporated and the residue distillated in a vacuum. Yield 10.6 g. of N-methyl-5-chloro-camphidine, B.P. 79° C./2 mm. Hg, M.P. 66–67° C.

The base thus obtained was dissolved in ether and the solution treated with dry hydrogen chloride. Filtration and crystallization from ethanolether gave 7.7 g. of N-methyl-5 - chloro-camphidine - hydrochloride, M.P. 265–267° C.

In an analogous manner other acid addition salts with anions which are relatively innocuous to the animal organism in therapeutic doses of the salt, such as another hydrohalide, a sulphate, phosphate, acetate or tartrate, may be prepared.

In a similar way N-ethyl-, N-n-propyl-, N-isopropyl-, N-n-butyl- and N-isobutyl-5-chloro-camphidine and their acid addition salts can be prepared.

Example 2

To a solution of 85.2% potassium hydroxide (23.2 g.) in ethanol (250 ml.) 5-chloro-camphoric acid imide (37.7 g.) and dimethylaminopropyl - chloride - hydrochloride (27.7 g.) were added and the mixture was heated under reflux for 6 hours with stirring. The precipitated potassium chloride was filtered off, the filtrate evaporated in a vacuum and the residue then dissolved in benzene and filtered. The filtrate was evaporated in a vacuum. The yield was 49.4 g. of crude N-dimethylaminopropyl-5-chloro-camphoric acid imide.

To a suspension of lithium aluminium hydride (14.3 g.) in dry ether (150 ml.) a solution of crude N-dimethylaminopropyl-5-chloro-camphoric acid imide (49.4 g.) in dry ether (600 ml.) was added with stirring, and the mixture then heated for 17 hours under reflux. After cooling water (18.4 ml.), a 15% solution of sodium hydroxide (18.4 ml.) and finally water (62.8 ml.) were added. The precipitated hydroxide was filtered off and washed six times with ether. The combined ether solution was dried with magnesium sulphate and the ether was distilled off. By vacuum-distillation of the residue N-dimethylaminopropyl-5-chloro-camphidine, B.P. 122.2–122.3° C./1.5–1.2 mm. Hg, was obtained. Yield 52.7%.

The base was dissolved in ether and treated with dry hydrogen chloride. Filtration and crystallization from ethanol gave N-dimethylaminopropyl-5-chloro-camphidine-hydrochloride, M.P. 293–296° C.

In an analogous manner other acid addition salts with anions which are relatively innocuous to the animal organism in therapeutic doses of the salt, such as another hydrohalide, a sulphate, phosphate, acetate or tartrate, may be prepared.

Similarly other N-alkylaminoalkyl-5 - chloro - camphidines, e.g. N-diethylaminopropyl-, N-dimethyylaminoethyl-, N-diethylaminoethyl- or N-methyl-N-ethylaminopropyl-5-chloro-camphidine, and their acid addition salts can be prepared.

Example 3

From N-methyl - 5 - chloro-camphidine hydrochloride (7.53 g.) prepared in the manner as described in Example 1, the free base N-methyl-5-chloro-camphidine was obtained by treatment with aqueous sodium hydroxide and extraction with ether. After drying with magnesium sulphate the ether was distilled off and the residue dissolved in ethanol (25 ml.). The solution was mixed with methyl iodide (3.94 ml.) and the mixture kept at 200° C. in an autoclave for 15 hours. After evaporation, the residue was dissolved in ethanol and ether was added. The precipitate was removed by filtration and recrystallized twice from ethanol (20 ml.). The yield of N,N-dimethyl-5-chloro-camphidinium-iodide was 4 g., M.P. 234° C.

The quarternization of the N-methyl-5-chloro-camphidine described above can in a similar manner be carried out with other quaternizing agents, such as other alkyl halides or dialkyl sulphates, e.g. dimethyl- or diethyl-sulphate, or with alkyl-substituted aromatic sulphonates, e.g. p-toluolenesulphonic acid methyl ester.

In a similar way quaternary salts of other N-alkyl-5-chloro-camphidines, such as N-ethyl-, N-n-propyl-, N-isopropyl-, N-n-butyl- and N-isobutyl-5-chloro-camphidine, can be prepared.

Example 4

A. A solution of N-dimethylaminopropyl-5-chloro-camphidine (50 g.), obtained in the manner as described in Example 2, in acetone (250 ml.) was cooled in ice and methyl iodide (45.5 ml.) was added. The mixture was at once transferred into an autoclave, heated for 17 hours to 120° C. and thereafter kept for 24 hours at room-temperature. The solid precipitate was removed by filtration, washed with acetone, dried by suction, washed several times with acetone and thereafter dried at first in a vacuum over calcium chloride and thereupon 5 hours at 0.03 mm. Hg and 60° C. The N-trimethylammoniumpropyl-N-methyl-5-chloro-camphidinium - diiodide obtained melts at 210–212° C. and contains 45.68% of iodine as compared with a theoretical iodine content of 45.5%. Yield 84.5%.

B. A mixture of N-trimethylammoniumpropyl-N-methyl-5-chloro-camphidinium-diiodide (135.7 g.), silver sulphate (79.5 g.) and water (1650 ml.) was heated 2 hours under reflux. The reaction mixture obtained was kept for 24 hours at room-temperature and the precipitated silver iodide was filtered off. The filtrate was evaporated in a vacuum while adding several times methanol. The dry residue which had a yellow colour, was dissolved in warm ethanol (500 ml.) and the solution was mixed with a cellulosic filter aid and filtered by suction. The filtrate was evaporated in a vacuum, the dry residue obtained was dissolved in water (500 ml.) and hydrogen sulphide was introduced into the solution until the precipitation of silver sulphide was terminated. The sulphide was filtered off and the filtrate was evaporated. The dry residue was dissolved in water (400 ml.) and filtered by suction in the presence of a cellulosic filter aid. The filtrate was filtered three times in the presence of decolorizing charcoal and evaporated in a vacuum while adding several times methanol and acetone. The solid residue was triturated with acetone, dried by suction and washed several times with acetone. The humid product was dried first in the vacuum produced by a water vacuum pump and thereafter for 4 hours at 70° C. in the vacuum produced by an oil pump and finally after pulverization for 8 hours at 70° C./3 mm. Hg. The N-trimethylammoniumpropyl-N-methyl-5-chloro-camphidinium-sulphate obtained melts at 168.5–171° C. and contains 7.82% sulphur as compared with a theoretical sulphur content of 8.03%. Yield 75%.

C. To a solution of N-dimethylaminopropyl-5-chloro-camphidine (1 g.) in acetone (5 ml.) was added dimethyl sulphate (0.99 ml.), which after a few seconds caused the separation of a solid substance. The mixture was refluxed for 18 hours and the acetone was removed by distillation. The viscous clear residue obtained was kept for several days at room-temperature and a slight crystallization took place. The residue was mixed with acetone and ether and inoculated with crystals from a previous preparation, which converted the residue into a solid crystalline product melting at 80–192° C. This product was dissolved in isopropanol (3.1 ml.) and ether (4 ml.) was added. By keeping the mixture in an ice-box a sticky semi-solid product precipitated, which was separated by decantation and triturated with acetone. The solid product thus formed had a loose crystalline structure and was filtered off and dried. The N-trimethylammoniumpropyl-N-methyl-5-chloro-camphidinium - dimethosulphate thus obtained melted at 205–210° C. and contained 12.21% sulphur, which is the theoretical sulphur content of the compound. Yield 11.4%.

D. To a solution of N-dimethylaminopropyl-5-chloro-camphidine (3 g.) in benzene (6 ml.) was added dimethyl sulphate (1.38 g.), which after a few seconds caused the separation of crystals. The mixture was kept for 2 days at room-temperature and the solid precipitate was filtered off, washed with ether and dissolved in isopropanol (6 ml.). The solution was kept in an ice-box and the crystals formed were filtered off, washed with ether and dried. The N-trimethylammoniumpropyl-5-chloro - camphidinium-methosulphate obtained melted at 186–205° C. Yield 76%.

The quaternization of the N-dimethylaminopropyl-5-chloro-camphidine described above can similarly be carried out with other quaternizing agents, such as other alkyl halides or dialkyl sulphates or with alkyl substituted aromatic sulphonates.

In a similar manner bis-quaternary salts of other N-alkylaminoalkyl-5-chloro-camphidines, e.g. N-diethyl-aminopropyl-, N-dimethylaminoethyl-, N-diethylamino-ethyl- or N-methyl-N-ethylaminopropyl-5-chloro-camphi-dine, can be prepared.

From the foregoing description of a novel class of compounds, particular exemplary members of the class and methods of synthesizing same, it will be understood that on the basis of the discovery and knowledge disclosed herein, other specific compounds can be made and variations in the methods of synthesis resorted to. Therefore the specific compounds and methods disclosed herein are to be considered in all respects as illustrative and not restrictive, the scope of the discovery being indicated by the appended claims rather than the foregoing description, and all specific compounds and variations and methods which come within the meaning and range of equivalency of the claims are therefore intended to be embraced therein.

What is claimed is:

1. A compound selected from the group consisting of N-dimethylaminopropyl - 5 - chloro-camphidine and the pharmaceutically acceptable acid addition salts and mono- and bis-quaternary methyl ammonium salts thereof having a pharmaceutically acceptable anion.

2. N-trimethylammoniumpropyl-N-methyl - 5 - chloro-camphidinium-diiodide.

3. N-trimethylammoniumpropyl-N-methyl - 5 - chloro-camphidinium-sulphate.

4. N-trimethylammoniumpropyl-N-methyl - 5 - chloro-camphidinium-dimethosulphate.

References Cited in the file of this patent

UNITED STATES PATENTS

| | | |
|---|---|---|
| 2,786,834 | Rice | Mar. 26, 1957 |
| 2,803,631 | Rice | Aug. 20, 1957 |